Nov. 19, 1968  R. M. LEWIS ET AL  3,412,394
PHOTOCELL CONTROLLED PEST, BIRD, AND ANIMAL CHASER
Filed Oct. 14, 1963
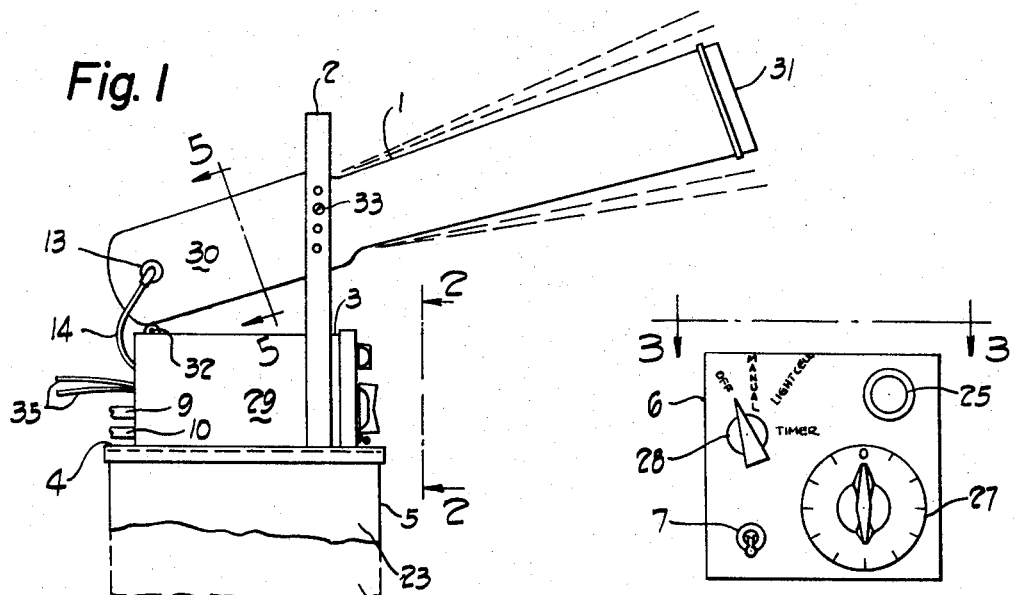
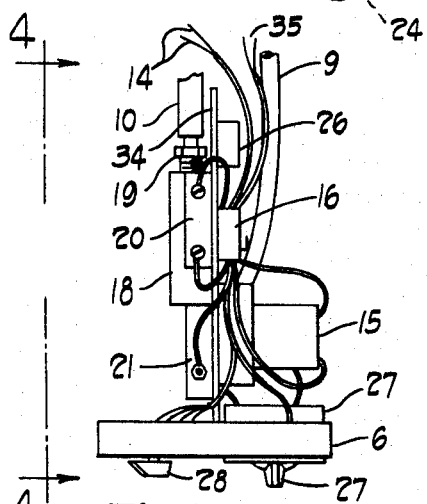
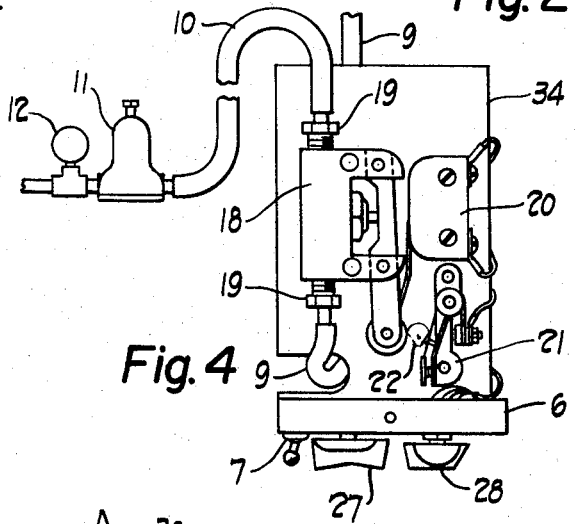
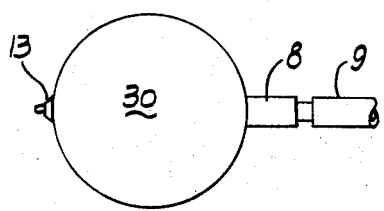
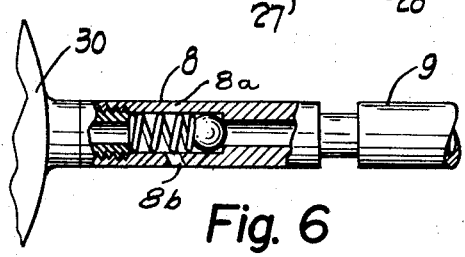
INVENTORS
J. C. STRASBOURGER
DEC'D
BY by A. M. STRASBOURGER
ADMINISTRATRIX
& R. M. LEWIS
Robb & Robb
attorneys United States Patent Office 3,412,394
Patented Nov. 19, 1968

3,412,394
PHOTOCELL CONTROLLED PEST, BIRD,
AND ANIMAL CHASER
Robert M. Lewis and Julius C. Strasbourger, Muncie, Ind.;
Anne M. Strasbourger, administratrix of said Julius C.
Strasbourger, deceased; said Lewis assignor to Anne M.
Strasbourger, administratrix of Julius C. Strasbourger,
deceased, Muncie, Ind.
Filed Oct. 14, 1963, Ser. No. 316,020
6 Claims. (Cl. 340—386)

The invention is actuated by a manual switch, light-sensitive cell or mechanical timer or any or all of these controls in any desired combination. The device is positive in operation and detonations are accurately spaced by an electric timing device which sequentially operates the gas inlet valve, igniter and the gas inlet valve closing switch if the mechanical timer or light control goes to the "OFF" position during the period when the gas inlet valve is in the "OPEN" position.

The intensity of the detonation can be controlled by adjusting the pressure regulator on the gas inlet supply line with any gas fuel, acetylene, liquid propane, methane, butane, or any other gas which will form an explosive mixture when mixed with a critical amount of an air oxygen mixture. In this invention the air oxygen mixture is supplied from air drawn into the combustion chamber thru holes in a specially vented nozzle sized to supply the correct amount of oxygen for the critical explosive mixture.

Power for the electric system can be from a "Hot-Shot" battery, a storage battery or conventional 110–120 volt lighting systems. The battery powered units can be completely self contained and portable.

Another mode of the invention is in the form of a kit comprising the essential elements of the control apparatus for attachment to and use with other types of bird frightening devices and thereby incorporating the advantages and improvements of this invention.

Other advantages of this invention will be disclosed in the following detailed description, claims, and accompanying drawings forming a part of this specification. Reference numbers refer to the items shown on the drawing.

The gas fuel supply is delivered from a tank or other source thru a T connection with a pressure gauge #12 (FIG. 4) showing supply pressure, then thru an adjustable pressure regulator #11 (FIG. 4) to the device supply hose, #10 (FIG. 1 and FIG. 4) which can be of any length to permit any elevation or separation of the supply line or tank from the Pest, Bird, and Animal Chaser device.

The electric power supply comes into the mechanism housing box #3 (FIG. 1) over wires #35 (FIG. 1 and FIG. 3) thru the back of the mechanism box #29 (FIG. 1) or thru the bottom plate #4 (FIG. 1) of the mechanism box #3 (FIG. 1) from the battery box #23 (FIG. 1) or #24 (FIG. 1). Battery box #23 (FIG. 1) is of such dimension as to enclose a 6 volt "Hot-Shot" dry battery or box #24 (FIG. 1) of sufficient size to accommodate a storage battery of the size desired. A carrying handle #2 (FIG. 1) is attached to the mechanism housing box #29 (FIG. 1) and the explosion chamber #30 (FIG. 1). This strap also serves as a front support for the explosion chamber #30 (FIG. 1) horn assembly #1 (FIG. 1).

The mechanism mounting plate #34 (FIG. 3 and FIG. 4) and mechanism box cover #6 (FIG. 2, FIG. 3 and FIG. 4) is an integral sheet metal assembly attached to mechanism box #29 (FIG. 1) by two sheet metal screws which when removed permit withdrawal of the mechanism mounting assembly from the mechanism box #29 (FIG. 1) for observation of operation and any required servicing.

Power leads are terminated on terminal strip #16 (FIG. 3) on the mechanism mounting plate #34 (FIG. 3) and feed wires connect from the terminal strip #16 (FIG. 3) to control switches #7 (FIG. 2) and #28 (FIG. 2) and to the supply valve closing switch #20 (FIG. 4) and the igniter points #21 (FIG. 4), the mechanical timer #27 (FIG. 3), the light cell #25 (FIG. 2), igniter leads #14 (FIG. 1) to the igniter #13 (FIG. 5) and to the light control relay or transistor #26 (FIG. 3). The igniter #13 (FIG. 5) may be either a resistance glow plug or a conventional automobile spark plug fed by a transistor triggered ignition coil (not shown on drawings).

When the control switch #28 (FIG. 2) is moved to the manual position, power is supplied to the electric timer #15 (FIG. 3) which rotates cam #22 (FIG. 4) at 1 r.p.m. and causes the opening lever on the gas inlet valve #18 (FIG. 4) to move downward opening this valve and permitting a measured amount of gas to pass into outlet hose #9 (FIG. 1 and FIG. 4) and thru the venting nozzle #8 (FIG. 5) into the explosion chamber #30 (FIG. 1 and FIG. 5).

Gas passage thru venting nozzle #8 (FIG. 5) aspirates air thru holes 8a and 8b (FIG. 6) in the sides of the nozzle to fill explosion chamber #30 (FIG. 1 and FIG. 5) with a critical mixture of the fuel gas and air. At the instant of closure of gas inlet lever valve #18 (FIG. 4) a flat on cam #22 (FIG. 4) permits momentary closing of spring loaded contact points #21 (FIG. 4) which energize wires #14 (FIG. 1) or the transistor triggered ignition coil and igniter or spark plug #13 (FIG. 5) causing ignition and detonation of the critical gas, air mixture in explosion chamber #30 (FIG. 1 and FIG. 5) and producing a sound wave propagation in excess of 150 db from the open end #31 (FIG. 1) of the horn #1 (FIG. 1) attached to the explosion chamber #30 (FIG. 1).

When control switch #28 (FIG. 2) is rotated to light cell position, light cell #25 (FIG. 2) is energized thru coil of light cell control relay or transistor #26 (FIG. 3) and if light intensity on light cell #25 (FIG. 2) is sufficient, light cell control relay or transistor #26 (FIG. 3) operates and energizes electric timer #15 (FIG. 3). Other operations are identical with the manual turn "ON" position of control switch #28 (FIG. 2) and the gas flow and ignition sequence continues until the light level striking light cell #25 (FIG. 2) drops to a minimum level at which time the light cell control relay #26 (FIG. 3) contacts open or the transistor #26 (FIG. 3) collector current goes to zero and the operation stops. If at the instant the contacts of the light cell control relay #26 (FIG. 2) open or the transistor #26 (FIG. 3) collector current drops to zero the point of cam #22 (FIG. 4) is in contact with the roller on the lever operated gas inlet valve #18 (FIG. 4) a set of contacts in the valve closer switch #20 (FIG. 4) continue the rotation of the timer cam #22 (FIG. 4) until the cam point has cleared the roller on the gas inlet valve #18 (FIG. 4) at which time the contacts in the valve closer switch #20 (FIG. 4) open and cut off power to the electric timer drive. This is to insure that gas fuel usage is not wasted when the light levels striking the light cell #25 (FIG. 2) are below the intensities of desired operation.

Sensitivity of the light control system is such that it will operate at lighting levels of ½ foot candle and the sensitivity can be reduced either by covering a portion of the face of the light cell #25 (FIG. 2) with any opaque material such as electrical tape or paint. Light sensitivity can also be reduced by using a higher resistance light cell.

When the main control switch #28 (FIG. 2) is turned to the timer position a circuit is established thru the manual timer #27 (FIG. 2 and FIG. 3). Turning the manual timer control knob clockwise to the desired period starts the operation of the mechanism and the operation continues for the desired period of up to 12 hours, at which time the control knob on the manual timer returns to the "OFF" O position and stops, unless the gas inlet valve #18 (FIG. 4) is in the open position. If this occurs the closed contacts in the valve closing switch #20 (FIG. 4) will continue the electric timer drive in operation until the cam #22 (FIG. 4) rotates to the valve closed position at which time the contacts in the valve control switch #20 (FIG. 4) will open, and open the circuit to the electric timer drive #15 (FIG. 3) and stop the operation with the gas supply valve in the closed position.

Equipped with a flat bottom mounting plate #4 (FIG. 1) the device can be mounted on a tripod or on top of a moving vehicle using the vehicle battery power thru leads #35 (FIG. 1) and fuel supply from an acetylene or propane tank carried in the vehicle.

With a hinged mounting #32 (FIG. 1) between the mechanism box #29 (FIG. 1) and the explosion chamber #30 (FIG. 1) and by changing the position of the attachment screws #33 (FIG. 1) in any of the several holes in the mounting strap handle #2 (FIG. 1) the angle of the horn #1 (FIG. 1) and explosion chamber #30 (FIG. 1) can be adjusted upward or downward.

Another mode of mounting the horn-explosion chamber assembly uses a solid weld at point #32 (FIG. 1) and on the side of the explosion chamber #30 (FIG. 1) at the strap handle at position #33 (FIG. 1) makes a fixed assembly with a predetermined angle of maximum sound propagation.

With electric supply from a conventional 110–120 volt AC system a small step-down transformer (not shown on the drawings) is mounted on the mechanism assembly plate #34 (FIG. 3). The electric timer operates directly from the 110 volt supply thru control switch #7 (FIG. 2) and the electric circuitry for the other controls from the secondary low voltage of the small step-down transformer.

The ignition circuit can be either a glow plug #13 (FIG. 5) or an ignition coil with transistor triggering assembly (not shown on drawings) and a conventional automobile spark plug as the gas ignitor.

Another mode of this invention (not shown on the drawing) combines the lever valve #18 (FIG. 4), the cam #22 (FIG. 4), the ignition points #21 (FIG. 4) and the valve closing switch #20 (FIG. 4) in one assembly. Operation will be identical with the equipment as described in these specifications.

Drain holes are provided to prevent water accumulation in the explosion chamber #30 (FIG. 1) at point #32, in the bottom of the mechanism box #29 (FIG. 1) and in the bottom of either side of the battery boxes ("Hot-Shot" or storage battery) if supplied with the device.

Having described the several models of this invention we claim the following as new, different and particularily advantageous.

1. In a chaser of the class described, in combination, a chamber, first means to supply an explosive mixture thereto, second means to ignite said mixture, timing means to operate the first and second means at intervals, and means to set timing means in operation including a photo-electric cell to initiate energization of the timing means when the light directed to the cell reaches a predetermined intensity.

2. In a chaser of the class described, in combination, a chamber, first means to supply an explosive mixture thereto, second means to ignite said mixture, timing means to operate the first and second means at intervals, and means to set timing means in operation including a photo-electric cell to initiate energization of the timing means when the light directed to the cell reaches a predetermined intensity, said photo-electric cell providing for de-energization of the timing means, when the light decreases below said predetermined intensity.

3. A chaser as claimed in claim 1, wherein the timing means rotates a cam, the cam operates an inlet valve to direct a predetermined amount of gas to the chamber, and means to supply air in proportion to the gas.

4. The combination as claimed in claim 3, wherein the cam includes means to actuate the ignition means.

5. The combination as claimed in claim 1, wherein the means to regulate the mixture supply includes a valve operable by a cam in the timing means, and a pressure regulator and fuel gas supply whereby intensity of sound propagation may be increased by increasing pressure to admit more mixture to the chamber.

6. The combination as claimed in claim 5, wherein a venting nozzle is positioned to direct gas to the chamber, said nozzle inducing a predetermined quantity of air into the chamber whilst gas is admitted thereto.

References Cited

UNITED STATES PATENTS

| | | | |
|---|---|---|---|
| 1,068,220 | 7/1913 | Cote et al. | 340—386 X |
| 2,304,358 | 12/1942 | Hennefer | 116—67 |
| 2,920,600 | 1/1960 | Katsu | 116—22 |
| 2,941,197 | 1/1960 | Morotta | 340—386 |
| 2,917,736 | 12/1959 | Morotta | 340—386 |
| 3,113,304 | 12/1963 | Lindey | 340—384 |

JOHN W. CALDWELL, *Primary Examiner.*

H. I. PITTS, *Assistant Examiner.*